United States Patent
Lownertz et al.

(10) Patent No.: US 8,518,273 B2
(45) Date of Patent: Aug. 27, 2013

(54) METHOD AND DEVICE FOR CLEANING OF FILTER

(75) Inventors: Patrik Lownertz, Taby (SE); Magnus Ingelman, Karlstad (SE)

(73) Assignee: Metso Paper Sweden AB, Sundsvall (SE)

( * ) Notice: Subject to any disclaimer, the term of this patent is extended or adjusted under 35 U.S.C. 154(b) by 771 days.

(21) Appl. No.: 11/568,317

(22) PCT Filed: May 24, 2005

(86) PCT No.: PCT/SE2005/000768
§ 371 (c)(1),
(2), (4) Date: Oct. 26, 2006

(87) PCT Pub. No.: WO2005/116329
PCT Pub. Date: Dec. 8, 2005

(65) Prior Publication Data
US 2007/0251891 A1    Nov. 1, 2007

(30) Foreign Application Priority Data

May 26, 2004 (SE) ..................... 0401358

(51) Int. Cl.
*B01D 29/64* (2006.01)
*B01D 29/68* (2006.01)
*D21C 11/04* (2006.01)

(52) U.S. Cl.
USPC .......... 210/791; 210/784; 210/331; 210/332; 210/402; 210/406; 210/407; 210/408; 210/409; 210/391; 210/396; 210/928; 162/30.11; 423/183; 423/DIG. 3

(58) Field of Classification Search
None
See application file for complete search history.

(56) References Cited

U.S. PATENT DOCUMENTS

| | | | | |
|---|---|---|---|---|
| 1,804,934 A * | 5/1931 | Hoyt | ............... | 210/327 |
| 2,839,194 A * | 6/1958 | Lopker et al. | ............... | 210/772 |
| 3,521,751 A * | 7/1970 | Holthuis | ............... | 210/797 |
| 4,207,141 A * | 6/1980 | Seymour | ............... | 162/49 |
| 4,528,103 A * | 7/1985 | Spilkin et al. | ............... | 210/791 |
| 4,929,355 A * | 5/1990 | Ragnegård et al. | ............... | 210/784 |
| 4,995,991 A * | 2/1991 | Ljokkoi et al. | ............... | 210/797 |
| 5,149,448 A * | 9/1992 | Mattelmaki | ............... | 210/784 |
| 5,151,176 A * | 9/1992 | Strid et al. | ............... | 210/178 |
| 5,374,360 A * | 12/1994 | Weis | ............... | 210/780 |
| 5,423,977 A * | 6/1995 | Aoki et al. | ............... | 210/107 |
| 5,470,472 A * | 11/1995 | Baird et al. | ............... | 210/391 |
| 5,759,397 A * | 6/1998 | Larsson et al. | ............... | 210/331 |
| 5,849,202 A * | 12/1998 | Koch et al. | ............... | 210/780 |
| 5,851,392 A * | 12/1998 | Brady, Jr. | ............... | 210/396 |
| 5,897,788 A * | 4/1999 | Ketolainen et al. | ............... | 210/784 |

(Continued)

FOREIGN PATENT DOCUMENTS

WO    WO 02063095 A1 *    8/2002

*Primary Examiner* — Robert James Popovics
(74) *Attorney, Agent, or Firm* — Rolf Fasth; Fasth Law Offices

(57) ABSTRACT

The method and arrangement is for cleaning at least one of filter sheets and filter cakes in a pressurized white liquor filter with spray nozzles and driving fluid. The white liquor filter is used in a causticizing process in which green liquor is causticized before the white liquor filter by the addition of lime and in which it forms during the process a lime mud slurry. The white liquor filter 101 is used to separate white liquor from the lime mud. The driving fluid for the spray nozzle is constituted principally by the filtrate that is obtained from the filter.

4 Claims, 2 Drawing Sheets

(56) References Cited

U.S. PATENT DOCUMENTS

| | | |
|---|---|---|
| 5,900,158 A | 5/1999 | Ruokolainen et al. |
| 5,968,372 A * | 10/1999 | Martensson et al. ........ 210/741 |
| 6,063,294 A * | 5/2000 | Martensson et al. ........ 210/739 |
| 6,074,522 A * | 6/2000 | Seymour ........................ 162/49 |
| 6,258,282 B1 | 7/2001 | Strid et al. |
| 6,596,166 B1 * | 7/2003 | Danielsson et al. ......... 210/324 |
| 6,793,809 B2 * | 9/2004 | Ingelman et al. ............ 210/143 |
| 6,800,197 B1 * | 10/2004 | Kosola et al. ................ 210/193 |
| 6,833,077 B2 * | 12/2004 | Flanagan ...................... 210/772 |
| 2004/0069721 A1 * | 4/2004 | Ingelman et al. ............ 210/767 |
| 2007/0221345 A1 * | 9/2007 | Lownertz ....................... 162/16 |
| 2007/0251891 A1 * | 11/2007 | Lownertz et al. ............ 210/791 |

* cited by examiner

METHOD AND DEVICE FOR CLEANING OF FILTER

PRIOR APPLICATION

This application is a U.S. national phase application based on International Application No. PCT/SE2005/000768, filed 24 May 2005, claiming priority from Swedish Patent Application No. 0401358-7, filed 26 May 2004.

TECHNICAL AREA

The present invention relates to a method and device for cleaning of a filter.

THE PRIOR ART

During the conventional production of liquor in a soda recovery boiler, sodium carbonate ($Na_2CO_3$) and sodium sulphide ($Na_2S$) flow out from the boiler in the form of a melt into a melt dissolver. The sodium carbonate and sodium sulphide are mixed in the melt dissolver with water to form a solution. This solution is normally known as "green liquor". Sludged contaminants are washed from the green liquor on output from the melt dissolver in a green liquor clarifier, which clarifier separates the sludge from the green liquor by sedimentation. It is also possible that cleaning of the green liquor take place through the use of suitable filter equipment. The green liquor is sent after cleaning to a lime slaker in which the green liquor is mixed with burnt lime, which consists principally of calcium oxide (CaO). The green liquor will now react with the burnt lime.

Initially, the liquor will undergo a slaking reaction in which the water in the green liquor reacts with the calcium oxide (CaO) and forms calcium hydroxide, slaked lime (CaOH). The volume of the solid lime particles increases in association with this reaction such that they break apart and form very small particles that form a slurry with the green liquor.

A second reaction will subsequently follow in which the slaked lime reacts with the carbonate present in the green liquor to form calcium carbonate ($CaCO_3$) and hydroxide ions ($OH^-$). At this stage the green liquor is said to have been "causticized". Particles of calcium carbonate are separated from the liquor in the next stage by filtration or by clarification. The cleaned liquor at this stage is known as "white liquor". The white liquor can now be used in a cooking process during the production of chemical paper pulp. The second waste product from the causticization process is known as "lime mud slurry". The lime mud slurry can be washed in water in one or several steps before it is dewatered to form lime mud and fed into a lime mud kiln. Calcination of the lime mud takes place in the lime mud kiln, which converts the content of calcium carbonate ($CaCO_3$) to slaked lime, which principally consists of calcium oxide (CaO). This slaked lime can subsequently be used as slaker in a lime slaker as described above.

Pressurised filters are normally used in the process step in which lime mud is separated from the white liquor. These filters comprise filter elements in the form of a sector that are fixed attached on a hollow shaft in such a manner that they form discs. The sectors are hollow and perforated, and their external surface is provided with a filter medium.

The sectors are attached to the shaft with a foot that is provided with an internal filtrate channel. The hollow shaft comprises one or several filtrate channels: furthermore, the hollow shaft is mounted in a pressure vessel in which the lower part of the vessel forms a trough. The filtrate channels on the shaft are connected to a filtrate separator and a compressor draws gas and filtrate internally relative to the filter sectors through the shaft and the filter separator. Liquor and gas are separated in the filtrate separator, where the gas is recirculated to the outer surface of the filter elements, and the gas in this way creates a flow through the filter medium.

Causticized lime mud slurry consists of lime mud that forms a slurry with white liquor that is fed to the trough in the pressure vessel. The drum or the discs rotate continuously in such a manner that parts of the drum surface or disc surface will temporarily be wetted by the lime mud slurry in the trough. The pressure difference created by the compressor means that parts of the lime mud slurry will create a cake of lime mud on the surface of the filter. The drum or discs continue to rotate such that new lime mud cake is formed. The lime mud cake is penetrated by the recirculated gas, and this means that the cake is dewatered. Scrapers are arranged on the side of the drum or discs that moves downwards with the aim of scraping off the outer surface of the lime mud that has been deposited. The deposited lime mud flows through channels together with the diluting water down into a lime mud dilution tank located under the pressure vessel. The lime mud and the water form together in the lime mud dilution tank a slurry that is subsequently pumped to a lime mud slurry tank. The section with the discs will become resubmerged in the trough through rotation and the process will be repeated.

That part of the lime mud cake that lies closest to the filter and that is not removed by the scraper is called "filter cake". The filter cake acts as a further filter medium and helps to maintain the level of lime mud solid particles in the liquor at a sufficiently low level. The method in which only the outer layer of the cake is scraped off by the scraper is furthermore advantageous in order to reduce the content of solid dry particles in the unloaded lime mud and is in this way advantageous for the complete liquor separation process.

However, the filter cake will with time become less permeable due to small particles clogging the pores of the filter cake and due to the blade of the scraper compacting the filter cake. The filter cake must for this reason be renewed at regular intervals. The removal of the filter cake is normally carried out with any one or several of the following methods:

a) Large parts of the filter cake are periodically removed by moving the scraper blade forwards to an inner position next to the filter medium and subsequently returning the scraper blade to its original position when the hollow shaft has performed one revolution.

b) The drum or the discs are placed under reverse pressure with pressurised air such that the filter cake loosens from the filter medium.

c) The filter is temporarily taken out of service and the complete surface is washed with water in order to renew the filter cake and wash the filter medium.

The final lime mud washing and lime mud dewatering take place conventionally before the lime kiln in a vacuum drum filter or a vacuum disc filter, both of which are of a type that forms filter cake. This type of filter has a function that is similar to that of the white liquor filter, but the vacuum filters operate in an open vacuum system in order to build up the pressure difference across the filter.

The filter cake in these vacuum filters is continuously or periodically renewed with the aid of spray nozzles that form a track in the filter cake in a spiral pattern.

These spray nozzles use system water from the mill. This does not constitute a problem for a lime mud filter in which a small addition of water to the filtrate does not have any significant significance.

However, adding water in a white liquor filter results in an inappropriate dilution of the white liquor end product. The extra addition of water must be dealt with during the evaporation process after the cooking process, and this involves additional expense for heating the water.

An example calculation of the extra cost per year that is generated by a dilution of water to 2% of the white liquor is given below:

The content of white liquor in association with the evaporation is approximately 4 cubic meters per tonne of pulp.

A dilution of 2% increases the water content by 4×0.02=0.08 cubic meter water per tonne of pulp.

The cost of heating one tonne of pulp is approximately SEK 20. An annual production of 500,000 tonnes means that this will give an extra cost for the addition of water of 0.08×20×500,000=800,000 SEK per year.

The principal aim of the present invention is to achieve an invention that removes or reduces the problems described above, with dilution of the white liquor in association with the renewal of the filter cake on pressurised filters with the aid of water under high pressure.

SUMMARY OF THE INVENTION

The present invention is based on the surprising insight that it is possible to reuse the filtrate from the white liquor filter, i.e. white liquor instead of water, in order to remove the filter cake and to clean the filter medium. This means that the final product, white liquor, will not be diluted to the same extent as previously.

The use of white liquor for this purpose is not by any means obvious, and it has not been used previously for the following reasons:

The white liquor may contain a number of remaining lime mud particles. It may be possible for this content of lime mud to lead to significant wear in pumps of cylinder type, which pumps are normally used to pressurise the nozzles in order to spray the filter cake away with water. Conventional nozzles that are normally used for this purpose may also be prematurely worn by the lime mud particles.

The high temperature of the white liquor, normally 94-98° C., may create problems for certain cylinder pumps.

These problems, however, can be overcome. The technology that is applied includes the possible use of filters for the recirculated white liquor and preferably the use of pumps.

DETAILED DESCRIPTION OF THE INVENTION

The concept "pressurised white liquor filter" will be mentioned in the following detailed description of the invention. The term "pressurised filter" is here used to denote both pressurised white liquor disc filters and pressurised white liquor drum filters. The term "white liquor filter" will be used to denote a filter in which a lime mud slurry is filtered and one in which the filtrate consists primarily of white liquor.

The term "filtrate" is here used to denote a fluid that principally consists of white liquor and one in which there may be present particles of lime mud.

The concepts "lime mud slurry" and "dewatered lime mud" will also be mentioned. The term "lime mud slurry" is here used to denote a slurry of lime mud that has not yet been dewatered in the filter and where the lime mud slurry contains lime mud+filtrate (where the filtrate principally consists of white liquor). The term "dewatered lime mud" is here used to denote lime mud that has been dewatered from filtrate by the filter and that contains only "pure" lime mud, intended for direct or indirect transport to a lime mud kiln.

Finally, the concepts "lime mud side" and "filtrate side" will be mentioned. The term "lime mud side" is here used to denote those sides of the disc or drum on which lime mud fastens during the filtration. The term "filtrate side" is here used to denote the side of the filters on which filtrate is present.

Figure 1:
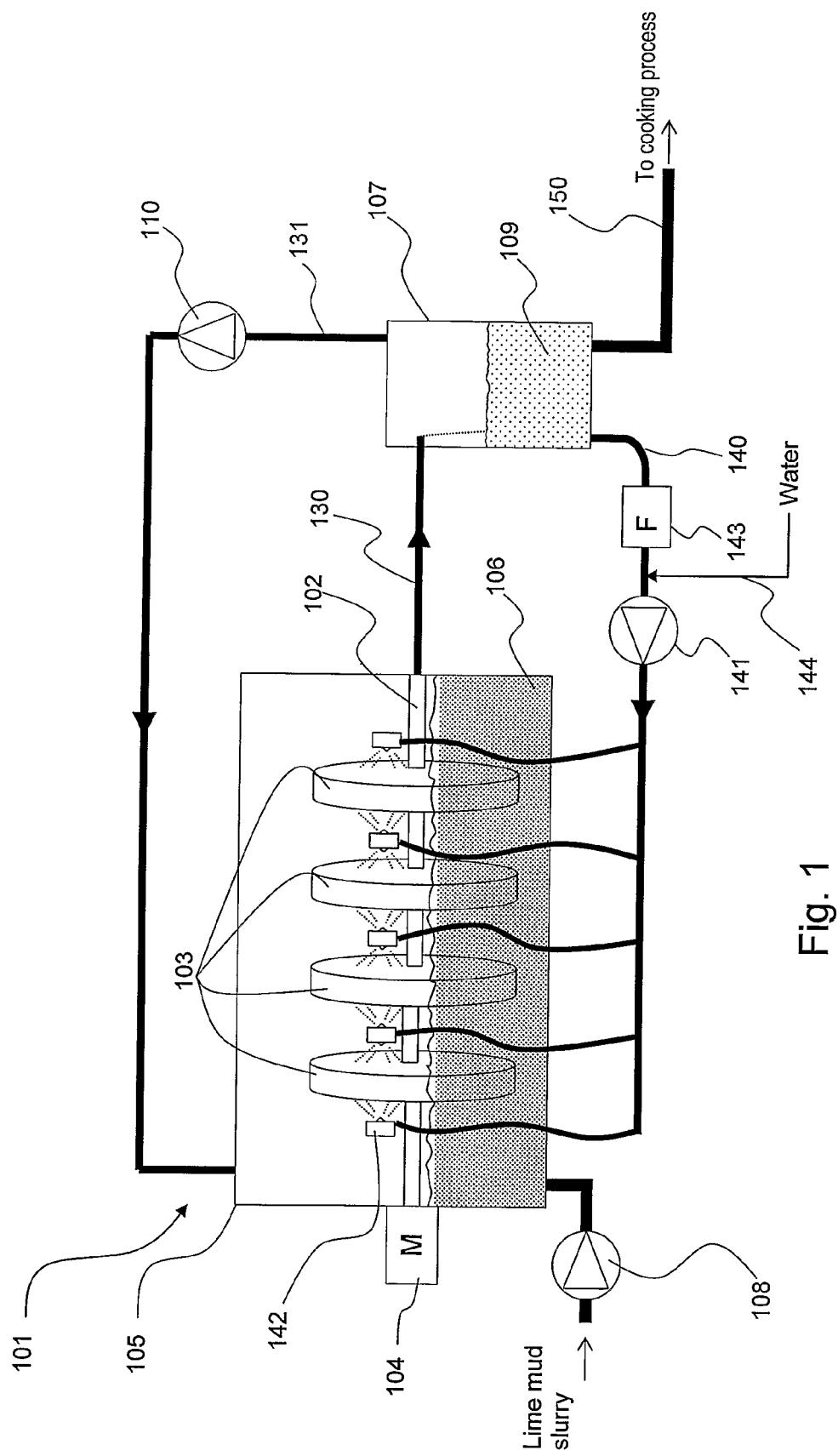
FIG. 1 shows schematically a first embodiment in which the invention is used on a pressurised disc filter.
Figure 2:
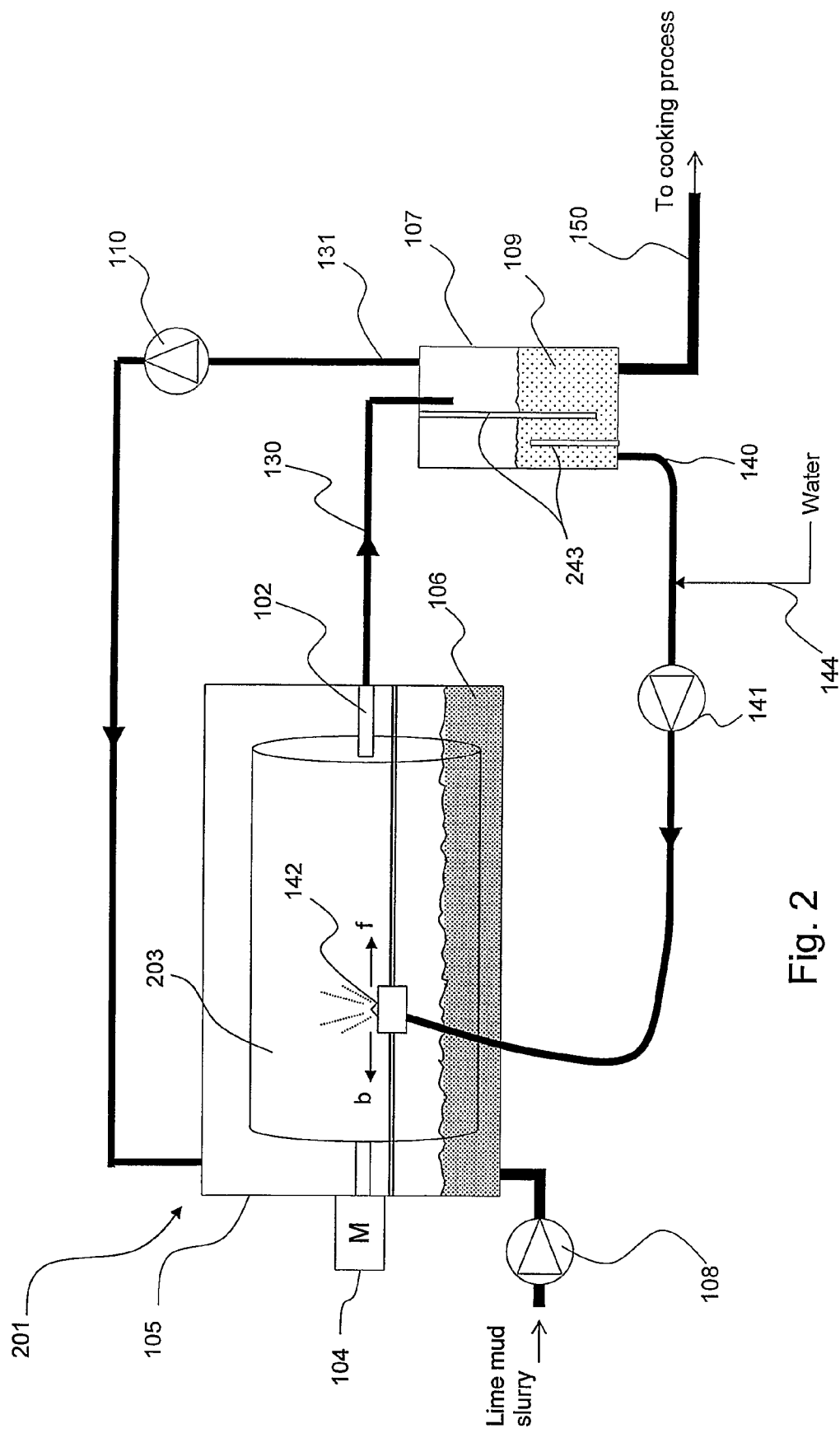
FIG. 2 shows schematically a second embodiment in which the invention is used on a pressurised drum filter.

FIG. 1 and FIG. 2 show a method and an arrangement for cleaning at least one of filter sheets and filter cakes in a pressurised white liquor filter 101, with at least one spray nozzle 142 and with driving fluid in a driving fluid line 140. The white liquor filter 101 is used in a causticizing process in which green liquor is causticized before the white liquor filter 101 by the addition of lime. Lime mud slurry is formed during the cauticizing process and the white liquor filter 101 is used to separate white liquor from the lime mud.

The white liquor filter 101 comprises a lime mud side on one side of the filter sheet in the filter and a filtrate side on the other side of the filter sheet, which filtrate side contains a filtrate tank 107 for the reception of filtrate that has been filtered through the filter sheet.

FIG. 1 shows a pressurised white liquor filter 101 in the form of a disc filter. The pressurised disc filter 101 comprises a hollow shaft 102 on which a number of filter-covered discs 103 are fixed arranged. The hollow shaft 102 is connected at one of its ends to a rotating shaft of a motor 104. The discs 103 and the hollow shaft 102 are surrounded by a pressurised vessel 105 that is part of the pressurised filter 101.

The filter-covered discs 103 are partially submerged in a lime mud slurry 106, where the filtrate is removed through the discs out through the hollow shaft 102 and onwards via a recirculation line 130 to a filtrate tank 107 on the filtrate side of the filter. A fluid level of the filtrate 109 from the pressurised filter 101 is established in the filtrate tank. The lime mud slurry 106 has been formed in a previous causticization process and the lime mud slurry 106 is pumped to the pressurised vessel 105 by at least one pump 108.

A recirculation line 131 for the recirculated gas phase passes from the gas phase on the filtrate side of the filter onwards to the lime mud side of the filter. A compressor 110 is arranged between the filtrate tank 107 and the lime mud side of the filter. The compressor 110 draws from its suction side (s) gas phase from the filtrate tank 107 and it pressurises on its pressurised side (p) the pressure vessel 105 on the lime mud side of the filter. The "filtrate side" of this filter is constituted by the space in the discs 103, the hollow shaft 102, and the filtrate tank 107. A transport line 150 is arranged from the filtrate tank 107 with the aim of transferring directly or indirectly filtrate to a cooking process.

Furthermore, a driving fluid line 140 is arranged from the filtrate tank 107 with the aim of transporting a portion of the filtrate through at least one high-pressure pump 141 to spray nozzles 142. The high-pressure pump 141 is preferably of a type that is insensitive to pumping fluids having the nature of white liquor.

A filter 143 may, where relevant, be placed on the filtrate side of the white liquor filter arranged on the driving fluid line 140 between the filtrate tank 107 and the spray nozzles 142 with the aim of filtering out any remaining lime mud particles from the filtrate. The filter 143 may, for example, be a polishing filter.

The driving fluid sprays through the spray nozzles 142 at least one of the filter and the filter cake clean on the discs. The driving fluid is principally constituted by filtrate from the filter 101.

FIG. 2 shows a pressurised white liquor filter 201 in the form of a drum filter. The difference between this and the disc filter 101 shown in FIG. 1 is that it is a drum 203 instead of discs 103, which drum 203 is fixed mounted on the hollow shaft 102. In this case it is the drum 203 that is partially submerged in the lime mud slurry 106, and the filtrate is withdrawn through the drum 203, out through the hollow shaft 102 and onwards via the recirculation line 130 to the filtrate tank 107 on the filtrate side of the filter.

It may be the case that the arrangement of a filter 243 of sediment type arranged in the filtrate tank 107 on the filtrate side of the white liquor filter can be used to filter out solid particles from the filtrate before the filtrate is withdrawn to the driving fluid line 140.

The embodiment in FIG. 2 is otherwise identical with the embodiment described in FIG. 1.

In order to prevent the spray nozzles 142 becoming clogged by filtrate, the driving fluid in the driving fluid line 140 can be diluted somewhat with water through a line 144. The amount of filtrate in the complete driving fluid line 140, however, is more than 50% and preferably more than 70%.

It is easy to realise that it is possible to combine the filter 143 in FIG. 1 and the filter 243 in FIG. 2, either the filters together or each filter individually, in both the disc filter and the drum filter.

The spray nozzles (142) are preferably arranged on a driving means that transports the spray nozzles (142) over a part of the total area of the filter on the filter sheet.

The invention is not limited to the embodiments shown. Several variants are possible within the framework of the claims.

While the present invention has been described in accordance with preferred compositions and embodiments, it is to be understood that certain substitutions and alterations may be made thereto without departing from the spirit and scope of the following claims.

The invention claimed is:

1. A method for cleaning a filter sheet and filter cake in a pressurized white liquor filter, comprising:
   providing a filter sheet and a filter cake disposed in a pressurized white liquor filter, the filter cake being a part of a lime mud cake being closest to the filter sheet, the filter cake not being removed by a scraper when the scraper scraping the lime mud cake;
   causticizing green liquor by adding lime thereto to form a lime mud slurry;
   the white liquor filter filtering white liquor from lime mud particles in the lime mud slurry to form a filtered white liquor, the white liquor filtrate being principally constituted by the white liquor filtered from the white liquor filter; and
   conveying the filtered white liquor to a container;
   a pump pumping the filtered white liquor from the container to a spray nozzle, and
   the spray nozzle spraying the filter sheet and filter cake with the filtered white liquor to clean the filter cake.

2. The method according to claim 1, wherein more than 50% of the white liquor used in a subsequent cooking process is constituted by the filtered white liquor that is obtained from the white liquor filter.

3. The method according to claim 1, wherein 100% of the white liquor used in a subsequent cooking process is constituted by the filtered white liquor that is obtained from the white liquor filter.

4. The method according to claim 1 wherein the white liquor used in a subsequent cooking process contains more than 75% of the filtered white liquor that is obtained in a preceding causticizing step.

* * * * *